United States Patent
Shomura et al.

(10) Patent No.: US 9,499,248 B2
(45) Date of Patent: Nov. 22, 2016

(54) TOE ANGLE CONTROL SYSTEM AND TOE ANGLE CONTROL METHOD FOR OUTBOARD MOTORS

(71) Applicant: SUZUKI MOTOR CORPORATION, Hamamatsu-shi, Shizuoka (JP)

(72) Inventors: Nobuyuki Shomura, Hamamatsu (JP); Akinori Yamazaki, Hamamatsu (JP); Toshinori Kono, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 0 days.

(21) Appl. No.: 14/842,789

(22) Filed: Sep. 1, 2015

(65) Prior Publication Data

US 2016/0068246 A1    Mar. 10, 2016

(30) Foreign Application Priority Data

Sep. 9, 2014   (JP) .................. 2014-183040

(51) Int. Cl.
| | |
|---|---|
| B63H 5/125 | (2006.01) |
| B63H 20/08 | (2006.01) |
| B63H 20/12 | (2006.01) |
| B63H 25/42 | (2006.01) |
| B63H 20/00 | (2006.01) |
| B63J 99/00 | (2009.01) |

(52) U.S. Cl.
CPC ............ *B63H 20/12* (2013.01); *B63H 25/42* (2013.01); *B63H 2020/003* (2013.01); *B63J 2099/008* (2013.01)

(58) Field of Classification Search
CPC  B63H 20/08; B63H 20/12; B63H 2020/003; B63H 2020/08

USPC ........................... 440/61 R, 61 S, 79
See application file for complete search history.

(56) References Cited

U.S. PATENT DOCUMENTS

| | | | | |
|---|---|---|---|---|
| 7,527,538 | B2 | 5/2009 | Mizutani | 440/61 S |
| 9,120,548 | B2* | 9/2015 | Nakayasu | B63H 21/21 |
| 2006/0240720 | A1* | 10/2006 | Yamashita | B63H 21/213 440/1 |
| 2007/0066157 | A1* | 3/2007 | Yamashita | B63H 5/125 440/63 |
| 2007/0207683 | A1 | 9/2007 | Mizutani | 440/53 |
| 2014/0106632 | A1* | 4/2014 | Nakayasu | B63H 21/21 440/1 |
| 2014/0364019 | A1* | 12/2014 | Ito | B63H 20/12 440/1 |
| 2015/0072575 | A1* | 3/2015 | Mizutani | B63H 25/42 440/1 |
| 2015/0166159 | A1* | 6/2015 | Inoue | B63H 20/12 440/53 |

FOREIGN PATENT DOCUMENTS

JP          4828897 B2     11/2011

* cited by examiner

*Primary Examiner* — Daniel V Venne
(74) *Attorney, Agent, or Firm* — Stein IP, LLC

(57) ABSTRACT

There is provided a toe angle control system for outboard motors. A memory stores therein a toe angle data table in which a running state of a ship and a lifting force generated along with propulsion of a plurality of outboard motors which are mounted on a body of the ship are associated with each other for each toe angle of the outboard motors. A controller is configured to adjust a toe angle of the outboard motors based on the running state of the ship and the toe angle data table. The toe angle data table is adapted to be associated with a plurality of running states of the ship mounted with the outboard motors. The controller selects a toe angle of the outboard motors so as to minimize the lifting force depending on a speed of the ship and trim angles of the outboard motors.

6 Claims, 9 Drawing Sheets

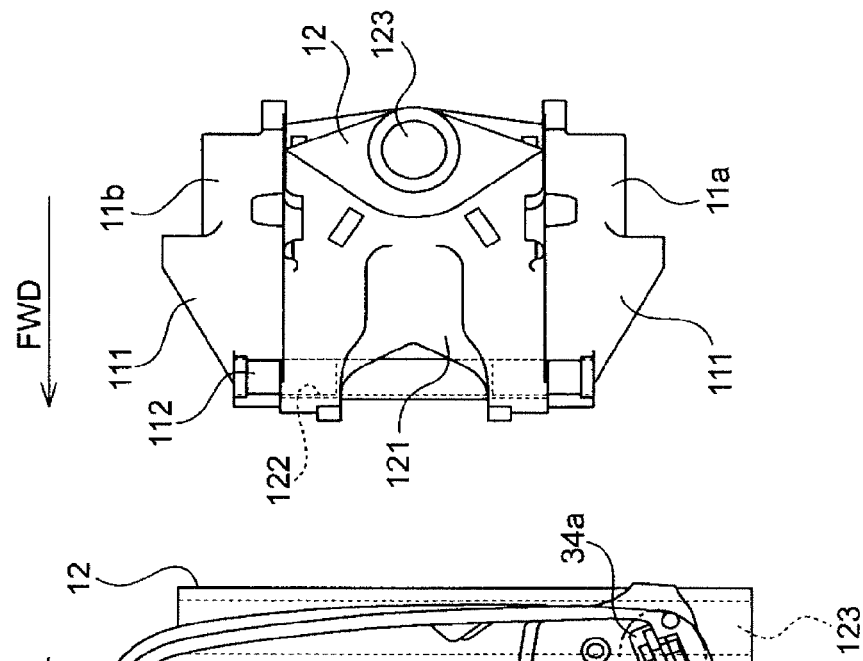
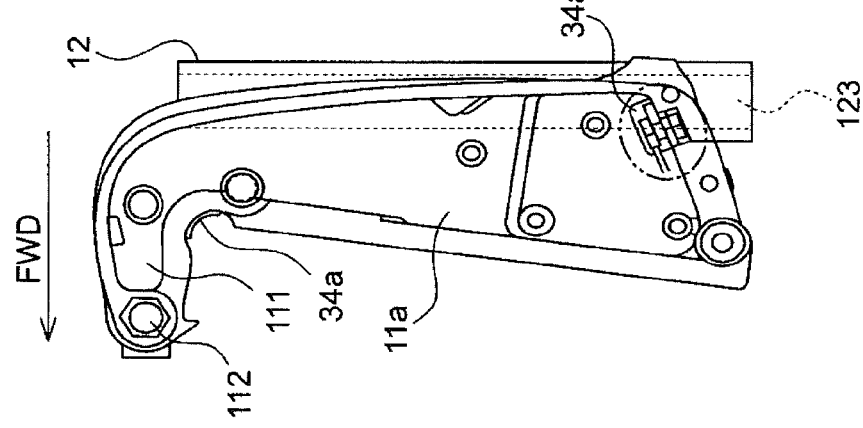
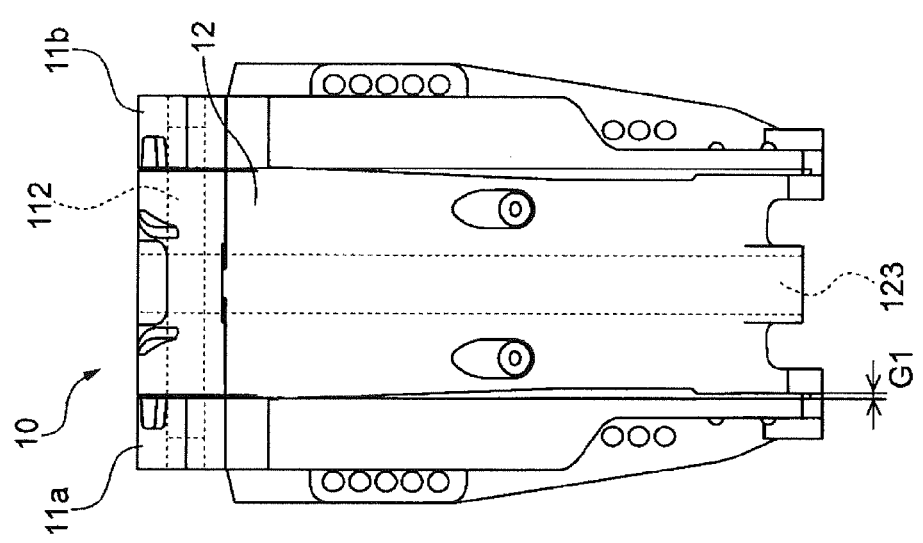

| TOE ANGLE T1 | | TRIM ANGLE | | | | |
|---|---|---|---|---|---|---|
| | | TR1 | TR2 | TR3 | TR4 | TR5 |
| SPEED | V1 | V1TR1 | V1TR2 | V1TR3 | V1TR4 | V1TR5 |
| | V2 | V2TR1 | V2TR2 | V2TR3 | V2TR4 | V2TR5 |
| | V3 | V3TR1 | V3TR2 | V3TR3 | V3TR4 | V3TR5 |
| | V4 | V4TR1 | V4TR2 | V4TR3 | V4TR4 | V4TR5 |
| | V5 | V5TR1 | V5TR2 | V5TR3 | V5TR4 | V5TR5 |

(TOE ANGLE T2, TOE ANGLE T3 — TRIM ANGLE tables behind)

TOE ANGLE CONTROL SYSTEM AND TOE ANGLE CONTROL METHOD FOR OUTBOARD MOTORS

CROSS-REFERENCE TO RELATED APPLICATIONS

The disclosure of Japanese Patent Application No. 2014-183040 filed on Sep. 9, 2014, including specification, drawings and claims is incorporated herein by reference in its entirety.

TECHNICAL FIELD

The present invention relates to a toe angle control system and a toe angle control method for outboard motors and, in particular, a toe angle control system and a toe angle control method for a plurality of outboard motors attached to a body of a ship.

BACKGROUND

Conventionally, a small ship in which a toe angle of a plurality of outboard motors attached to a body thereof is adjusted in accordance with switch operations by a ship operator has been proposed (e.g., see Patent Document 1). The small ship described in Patent Document 1 is configured so that one running mode, which puts priority on the highest speed thereof, and another running mode, which puts priority on acceleration within a short time period, are previously prepared and a toe angle of outboard motors is adjusted to be suited to the running modes in accordance with switch operations of the ship operator.

Patent Document 1: Japanese Patent No. 4828897

However, in the small ship described in Patent Document 1 as described above, the toe angle of the outboard motors is adjusted in accordance with switch operations by the ship operator. Accordingly, because switch operations by the ship operator is required when the toe angle is adjusted, there is a problem in that operations required for obtaining a running performance suitable to a desired running mode is complex.

In addition, an optimal toe angle for outboard motors is varied depending on positions on the body, to which outboard motors are attached, inherent properties of the outboard motors, a shape of the body, and a running state. A speed or fuel efficiency of a ship is strongly influenced by the toe angle of the outboard motors. Accordingly, setting the outboard motors to have an optimal toe angle is the important factor in terms of a running performance or fuel efficiency of the ship.

SUMMARY

It is an object of the present invention to provide a toe angle control system and a toe angle control method for outboard motors, in which an optimal toe angle can be set to outboard motors without requiring complex operations from a ship operator.

According to an aspect of the embodiments of the present invention, there is provided a toe angle control system for outboard motors, comprising: a plurality of outboard motors mounted on a body of a ship; a running state detector configured to detect a speed of the ship and trim angles of the outboard motors as a running state of the ship; a lifting force detector configured to detect a lifting force generated along with propulsion of the plurality of outboard motors; a memory configured to store therein a toe angle data table in which the running state of the ship detected by the running state detector and the lifting force detected by the lifting force detector are associated with each other for each toe angle of the outboard motors; and a controller configured to adjust a toe angle of the outboard motors based on the running state of the ship detected by the running state detector and the toe angle data table stored in the memory, wherein the toe angle data table associated with a plurality of running states of the ship in a state where the plurality of outboard motors are mounted on the ship is stored in the memory, and wherein the controller selects a toe angle of the outboard motors so as to minimize the lifting force depending on the speed of the ship and the trim angles of the outboard motors detected by the running state detector.

According to this configuration, the toe angle of the outboard motors is selected to minimize a lifting force depending on a speed of the ship and a trim angle of the outboard motors detected by the running state detector on the basis of the contents of the toe angle data table. Accordingly, the toe angle of the outboard motors is adjusted to be optimized to a current running state of the ship by the controller. As a result, an optimal toe angle can be set to the outboard motors without requiring complex operations from the ship operator.

In the toe angle control system for the outboard motors, the lifting force detector may detect the lifting force as a function of a load acted on clamp brackets constituting an attachment device for attaching the outboard motors to the body. In this case, because the lifting force is detected as a function of a load acted on the clamp brackets, the lifting force generated along with the propulsion of the outboard motors can be precisely detected. Thus, precision of lifting forces recorded in the toe angle data table can be ensured and thus precision of adjustment of the toe angle by the controller can be enhanced.

In the toe angle control system for the outboard motors, the lifting force detector may detect the lifting force as a function of displacement of clamp brackets and a swivel bracket constituting an attachment device for attaching the outboard motors to the body. In this case, because the lifting force is detected as a function of displacement of the clamp brackets and the swivel bracket, the lifting force generated along with the propulsion of the outboard motors can be precisely detected. Thus, precision of lifting forces recorded in the toe angle data table can be ensured and thus precision of adjustment of the toe angle by the controller can be enhanced.

In the toe angle control system for the outboard motors, the lifting force detector may detect the lifting force as a function of displacement of a mount device arranged between an attachment device for attaching the outboard motors to the body and the outboard motors. In this case, because the lifting force is detected as a function of displacement of the mount device, the lifting force generated along with the propulsion of the outboard motors can be precisely detected. Thus, precision of lifting forces recorded in the toe angle data table can be ensured and thus precision of adjustment of the toe angle by the controller can be enhanced.

In the toe angle control system for the outboard motors, the lifting force detector may detect the lifting force as a function of displacement of a component of the outboard motors. In this case, because the lifting force is detected as a function of displacement of a component of the outboard motors, the lifting force generated along with the propulsion of the outboard motors can be precisely detected.

According to another aspect of the embodiments of the present invention, there is provided a toe angle control method in a toe angle control system for outboard motors, the toe angle control system comprising: a plurality of outboard motors mounted on a body of a ship; a running state detector configured to detect a running state of a ship; a lifting force detector configured to detect a lifting force generated along with propulsion of the plurality of outboard motors; a memory configured to store therein a toe angle data table in which the running state of the ship detected by the running state detector and the lifting force detected by the lifting force detector are associated with each other for each toe angle of the outboard motors; and a controller configured to adjust a toe angle of the outboard motors based on the running state of the ship detected by the running state detector and the toe angle data table stored in the memory, the toe angle control method comprising: storing the toe angle data table associated with a plurality of running states of the ship in a state where the plurality of outboard motors are mounted on the ship, in the memory; and selecting a toe angle of the outboard motors so as to minimize the lifting force depending on a speed of the ship and trim angles of the outboard motors detected by the running state detector.

According to this method, the toe angle of the outboard motors is selected to minimize a lifting force depending on a speed of the ship and a trim angle of the outboard motors detected by the running state detector on the basis of the contents of the toe angle data table. Accordingly, the toe angle of the outboard motors is adjusted to be optimized to a current running state of the ship by the controller. As a result, an optimal toe angle can be set to the outboard motors without requiring complex operations from the ship operator.

According to the present invention, an optimal toe angle can be set to outboard motors without requiring complex operations from a ship operator.

BRIEF DESCRIPTION OF THE DRAWINGS

In the accompanying drawings:

FIGS. 5A to 5C are explanatory views of an attachment device for attaching the outboard motor to a body of a ship according to the present embodiment;

DETAILED DESCRIPTION OF THE EMBODIMENTS

Now, the present embodiment will be described in detail with reference to the accompanying drawings. Meanwhile, in the following, a case where an outboard motor toe angle control system according to the present invention is applied to a ship whose body is mounted with two outboard motors will be described. However, a ship as an applicable subject of the outboard toe angle control system according to the present invention is not limited to that. For example, the present invention may be also applied to a ship whose body is mounted with three or more outboard motors.

Figure 1:
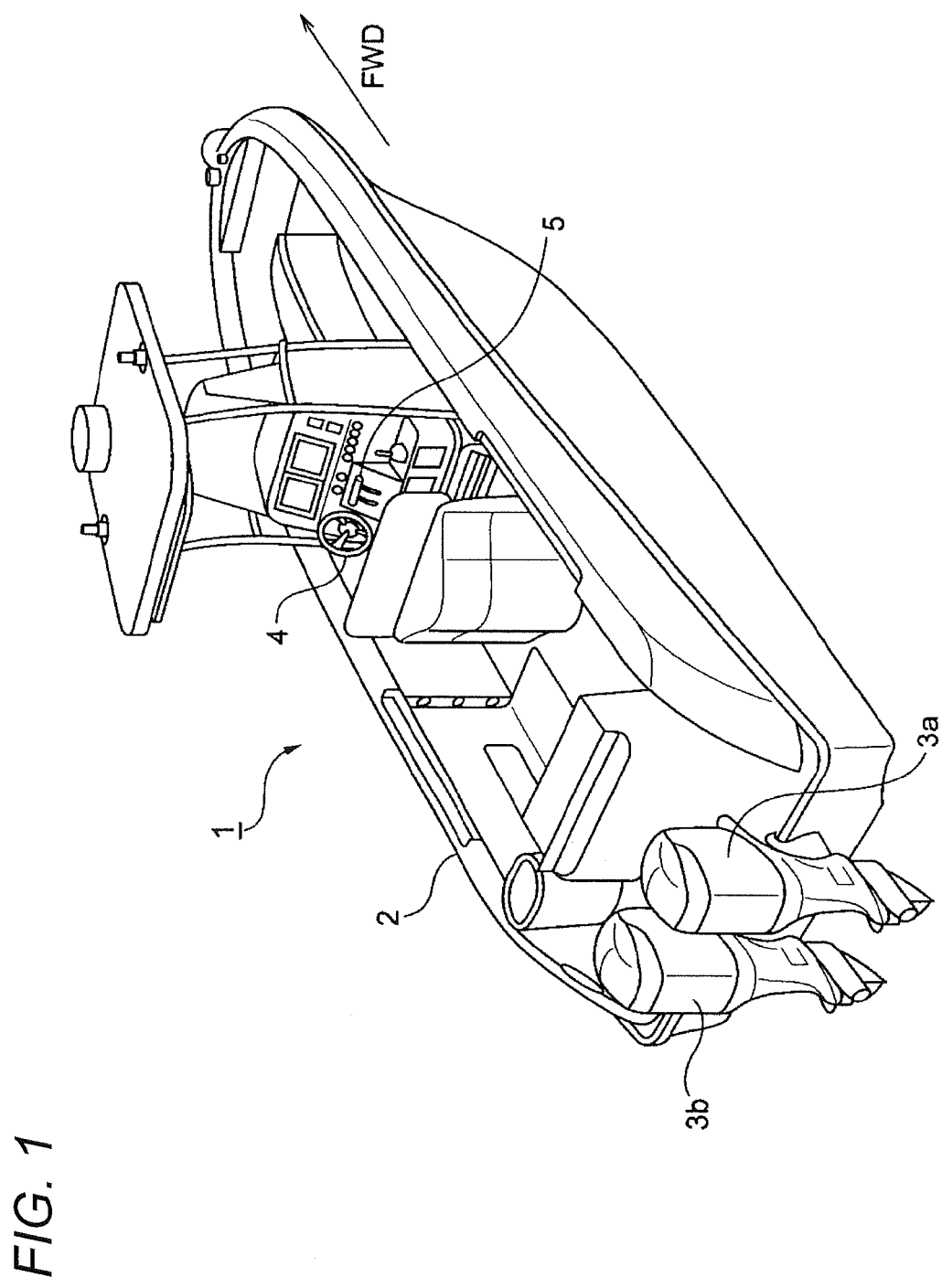
FIG. 1 is a perspective view showing the exterior of a ship mounted with an outboard motor toe angle control system according to the present embodiment.
Figure 2:
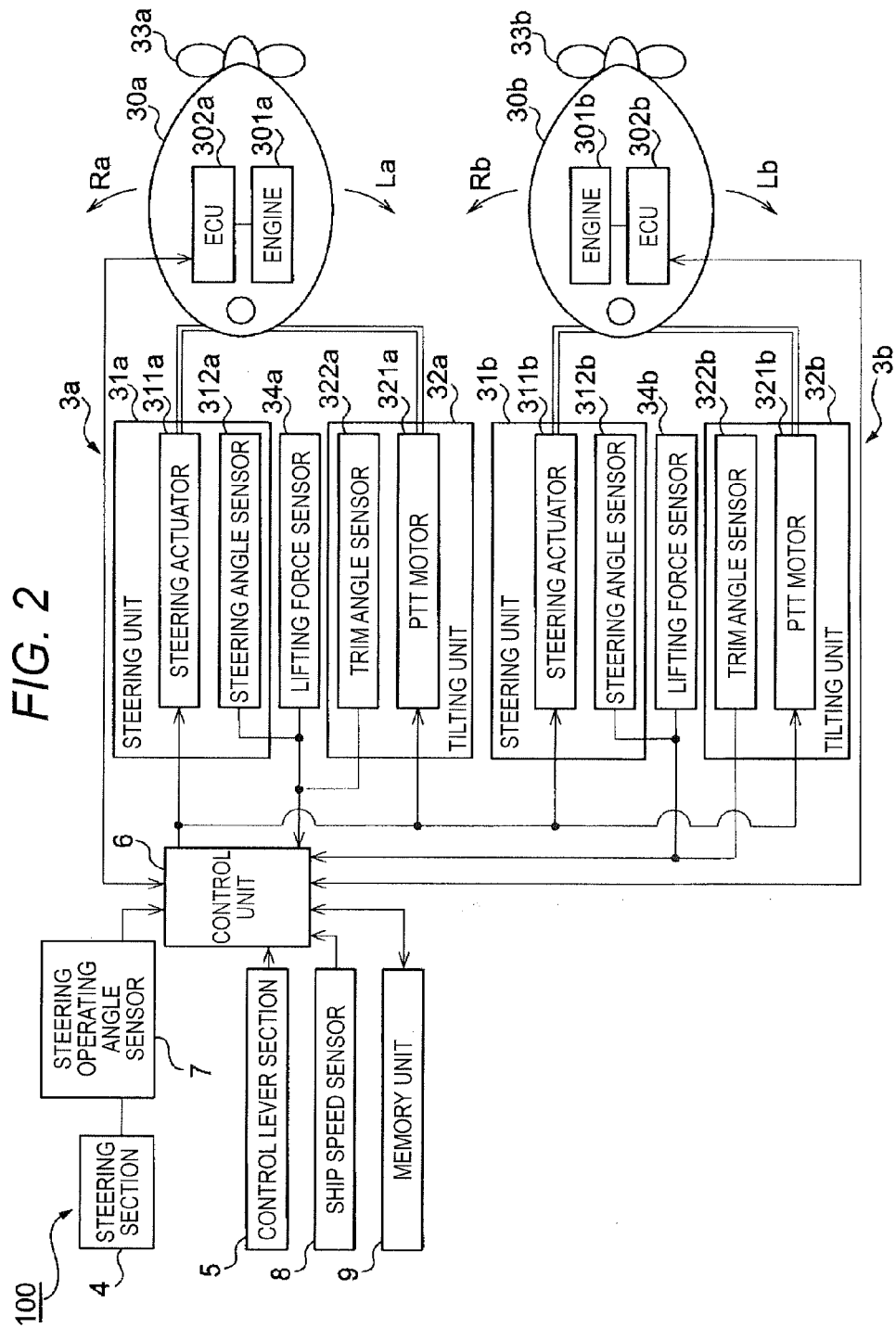
FIG. 2 is a block diagram explaining configurations of the outboard motor toe angle control system according to the present embodiment.
Figure 3:
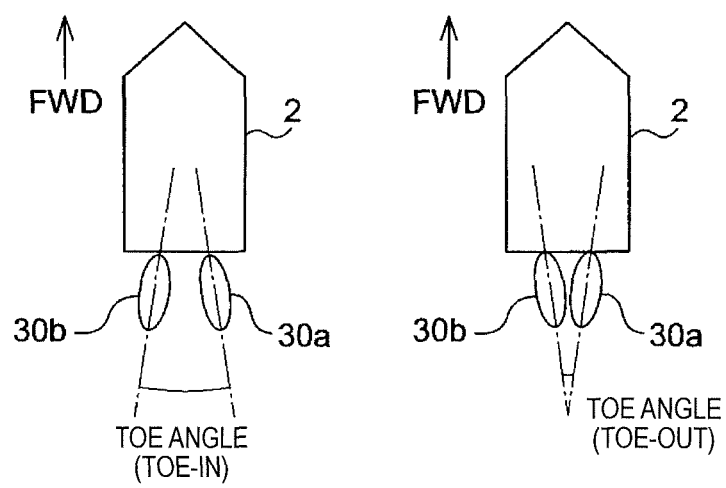
FIG. 3 is an explanatory view of a toe angle of outboard motors controlled by the outboard motor toe angle control system according to the present embodiment.

First, configurations of the outboard toe angle control system (hereinafter, simply referred to as 'toe angle control system') according to the present embodiment will be described with reference to FIGS. 1 to 3. FIG. 1 is a perspective view showing the exterior of a ship mounted with the toe angle control system according to the present embodiment. FIG. 2 is a block diagram explaining configurations of the toe angle control system according to the present embodiment. FIG. 3 is an explanatory view of a toe angle of outboard motors controlled by the toe angle control system according to the present embodiment. Meanwhile, 'FWD' shown in FIG. 1 designates a forward movement direction of a ship, and this is equally applied to the figures following FIG. 3.

As shown in FIGS. 1 and 2, a ship 1 to which the toe angle control system 100 according to the present embodiment is applied is provided with a body 2 adapted to be floated on a water surface, two outboard motors 3a and 3b mounted on a stem of the body 2, a steering section 4 constituted of a steering wheel for steering the body 2, and a control lever section 5 for operating the body 2 to be moved forward and backward. The ship 1 is configured to be capable of running while changing a steering angle and an engine rotational number of the outboard motors 3a and 3b, as a ship operator operates the steering section 4 and the control lever section 5.

As shown in FIG. 2, the outboard motor 3a includes an outboard motor body 30a configured to be pivotable in right and left directions (La direction and Ra direction) and upward and downward directions with respect to the body 2, a steering unit 31a for pivoting the outboard motor body 30a in the right and left directions, a tilting unit 32a for pivoting the outboard motor body 30a in the upward and downward directions, a propeller 33a provided on the outboard motor body 30a, and a lifting force sensor 34a for detecting a lifting force generated along with propulsion of the outboard motor 3a.

The outboard motor body 30a has an engine 301a and an ECU 302a electrically connected to the engine 301a. The engine 301a supplies a driving force for rotating the propeller 33a. The ECU 302a controls the driving force to be supplied from the engine 301a to the propeller 33a. The ECU 302a can control a rotation direction of the propeller 33a and also control a rotational speed of the propeller 33a.

The steering unit 31a is intended to pivot the outboard motor body 30a, which is held on a swivel bracket 12 as described below, in the right and left directions of the body 2 and has a steering actuator 311a and a steering angle sensor 312a. The steering actuator 311a supplies a driving force for pivoting the outboard motor body 30a in the right and left directions of the body 2. The steering angle sensor 312a detects a steering angle of the outboard motor body 30a driven by the steering actuator 311a.

The tilting unit 32a is intended to pivot the outboard motor body 30a, which is held on the swivel bracket 12 as described below, in the upward and downward directions of the body 2 and has a PTT motor 321a and a trim angle sensor 322a. The PTT motor 321a supplies a driving force for pivoting the outboard motor body 30a in the upward and downward directions of the body 2. The trim angle sensor 322a is intended to constitute a running state detector and detects a trim angle of the outboard motor body 30a driven by the PTT motor 321a.

The propeller 33a is rotated under control of the ECU 302a of the outboard motor body 30a. In addition, the propeller 33a is controlled to be rotated in a direction opposite to that of a propeller 33b of the outboard motor 3b. The lifting force sensor 34a is intended to constitute a lifting force detector and is installed at a predetermined position on an attachment device 10, as described below, for attaching the outboard motor 3a to the body 2 or at a predetermined position on the mount device 20, as described below, arranged between the attachment device 10 and the outboard motor 3a. Meanwhile, the installation position of the lifting force sensor 34a will be described below.

Like the outboard motor 3a, the outboard motor 3b includes an outboard motor body 30b configured to be pivotable in right and left directions (Lb direction and Rb direction) and upward and downward directions with respect to the body 2, a steering unit 31b for pivoting the outboard motor body 30b in the right and left directions, a tilting unit 32b for pivoting the outboard motor body 30a in the upward and downward directions, a propeller 33b provided on the outboard motor body 30b, and a lifting force sensor 34b for detecting a lifting force generated along with propulsion of the outboard motor 3b.

Like the outboard motor body 30a, the outboard motor body 30b has an engine 301b and an ECU 302b electrically connected to the engine 301b. The engine 301b supplies a driving force for rotating the propeller 33b. The ECU 302b controls the driving force to be supplied from the engine 301b to the propeller 33b. The ECU 302b can control a rotation direction of the propeller 33b and also control a rotational speed of the propeller 33b.

Like the steering unit 31a, the steering unit 31b is intended to pivot the outboard motor body 30b, which is held on the swivel bracket 12 as described below, in the right and left directions of the body 2 and has a steering actuator 311b and a steering angle sensor 312b. The steering actuator 311b supplies a driving force for pivoting the outboard motor body 30b in the right and left directions of the body 2. The steering angle sensor 312b detects a steering angle of the outboard motor body 30b driven by the steering actuator 311b.

Like the tilting unit 32a, the tilting unit 32b is intended to pivot the outboard motor body 30b, which is held on the swivel bracket 12 as described below, in the upward and downward directions of the body 2 and has a PTT motor 321b and a trim angle sensor 322b. The PTT motor 321b supplies a driving force for pivoting the outboard motor body 30b in the upward and downward directions of the body 2. The trim angle sensor 322b is intended to constitute the running state detector and detects a trim angle of the outboard motor body 30b driven by the PTT motor 321b.

Like the propeller 33a, the propeller 33a is rotated under control of the ECU 302b of the outboard motor body 30b. In addition, the propeller 33b is controlled to be rotated in a direction opposite to that of the propeller 33a of the outboard motor 3a. The lifting force sensor 34b is intended to constitute the lifting force detector, and like the lifting force sensor 34a, is installed at a predetermined position on an attachment device 10, as described below, for attaching the outboard motor 3b to the body 2 or at a predetermined position on the mount device 20, as described below, arranged between the attachment device 10 and the outboard motor 3b.

The ship 1 is provided with a control unit 6 for performing all controls related to running of the ship 1, including control of the toe angle control system 100 according to the present embodiment. The control unit 6 constitutes a controller. The control unit 6 is connected with various sensors provided in the ship 1 and also with the ECU 302a and 302b of the outboard motor bodies 30a and 30b, the steering actuators 311a and 311b of the steering units 31a and 31b and the PTT motors 321a and 321b of the tilting units 32a and 32b.

The ship 1 is provided with, as sensors to be connected to the control unit 6, a steering operating angle sensor 7 and a ship speed sensor 8, in addition to the steering angle sensor 312a, the trim angle sensor 322a and the lifting force sensor 34a of the outboard motor 3a as described above and the steering angle sensor 312b, the trim angle sensor 322b and the lifting force sensor 34b of the outboard motor 3b as described above. The steering operating angle sensor 7 is connected to the steering section 4 to detect a rotational angle (steering angle) of the steering section 4 upon rotation thereof. The ship speed sensor 8 is intended to constitute the running state detector and detects a speed of the ship 1 (body 2) during running thereof. For example, the ship speed sensor 8 detects the speed of the body 2 during running by detecting a flow of water when the ship 1 is running The control unit 3 controls components (ECU 302a and 302b of the outboard motor bodies 30a and 30b, steering actuators 311a and 311b of the steering units 31a and 31b, and PTT motors 321a and 321b of the tilting units 32a and 32b) of the outboard motors 3a and 3b based on detection signals from such various sensors, thereby running the ship 1 in accordance with instructions from the ship operator and also controlling a toe angle of the outboard motors 3a and 3b (outboard motor bodies 30a and 30b).

For example, as shown in FIG. 3, the control unit 6 adjusts a toe angle of the outboard motor bodies 30a and 30b to become a toe-in state where two propellers 33a and 33b are apart from each other and adjusts a toe angle of the outboard motor bodies 30a and 30b to become a toe-out state where two propellers 33a and 33b a come close to each other. In particular, the control unit 6 controls a toe angle of the outboard motor bodies 30a and 30b so that an optimal toe angle in accordance with a running state of the ship 1 can be selected.

Also, the control unit 6 is connected with a memory unit 9 constituting a memory. A toe angle data table used in a toe angle control process executed by the control unit 6 is stored in the memory unit 9. In the toe angle data table, a running state of the ship 1 (ship speed and trim angle) and a lifting force detected by the lifting force sensors 34a and 34b are recorded to be associated with each other for each toe angle of the outboard motor bodies 30a and 30b. In addition, contents of the toe angle data table is leaned by a toe angle learning process executed by the control unit 6. Details of the toe angle learning process and toe angle control process will be described below.

Now, a lifting force generated in the outboard motors 3a and 3b, to which the toe angle control system according to the present embodiment is applied, and installation positions of the lifting force sensors 34a and 34b for detecting the lifting force will be described with reference to FIGS. 4 to 8B. Meanwhile, the installation positions of the lifting force sensors 34a and 34b can be set in common in the outboard motors 3a and 3b. Accordingly, in the following, the installation position of the lifting force sensor 34a will be described by way of example and the description of the installation position of the lifting force sensor 34b will be omitted. First, schematic configurations of the outboard motors 3a and 3b to which the toe angle control system 100 according to the present embodiment is applied will be described.

Figure 4:
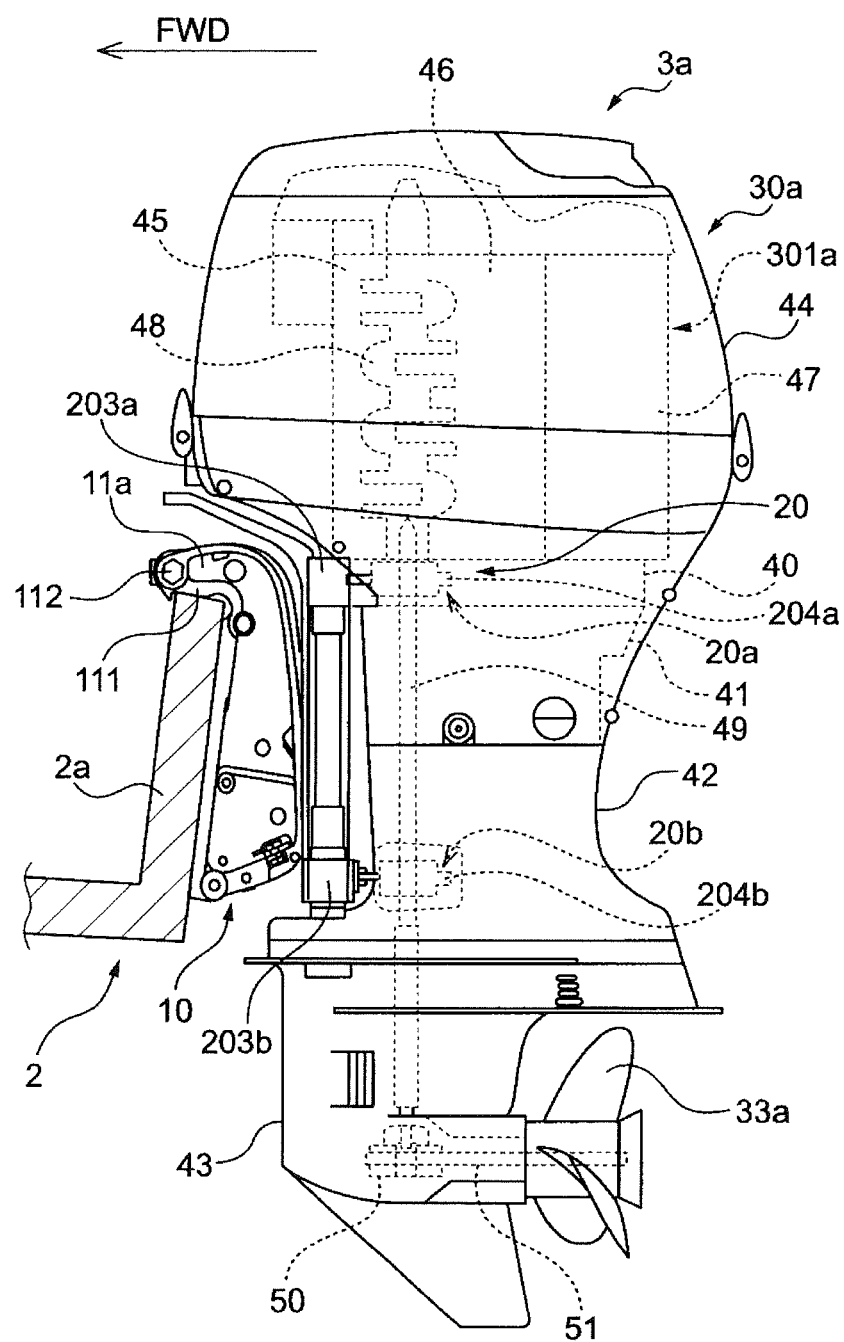
FIG. 4 is a side view of an outboard motor to which the outboard motor toe angle control system according to the present embodiment is applied.
Figure 7:
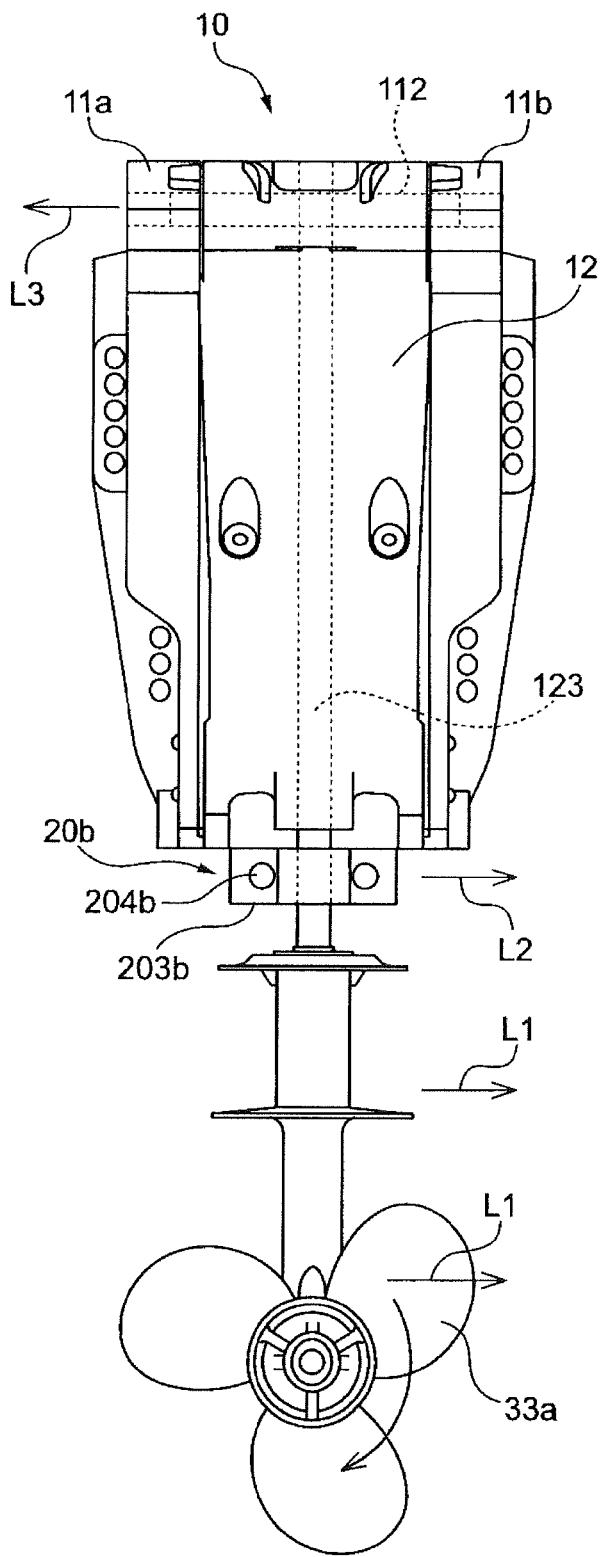
FIG. 7 is an explanatory view of a lifting force acted on the outboard motor according to the present embodiment.
Figure 8A:
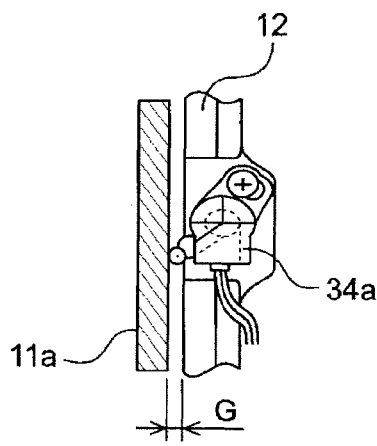
FIGS. 8A and 8B are explanatory views of a displacement of the attachment device shown in FIGS. 5A to 5C.
Figure 8B:
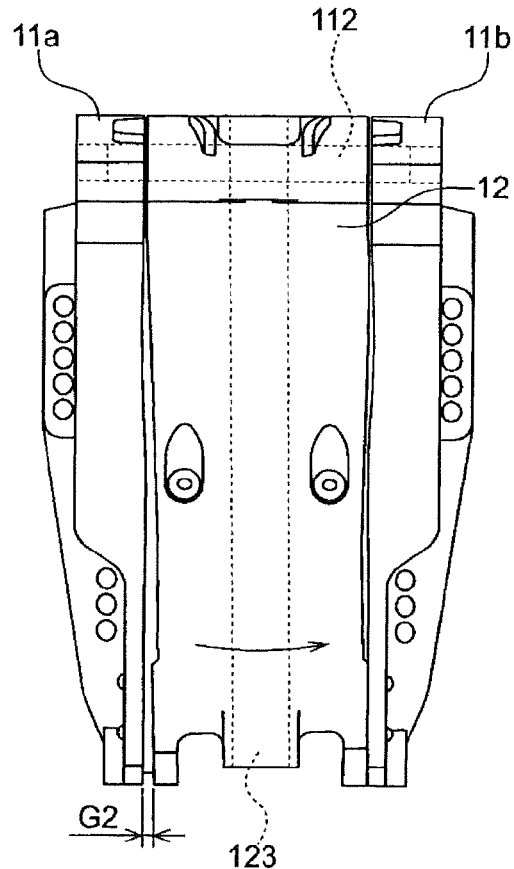

FIG. 4 is a side view of the outboard motor 3a to which the toe angle control system 100 according to the present embodiment is applied. FIGS. 5A to 5C are explanatory views of the attachment device for attaching the outboard motor 3a to the body 2 according to the present embodiment. Meanwhile, FIGS. 5A and 5C show, respectively, the attachment device as viewed from a rear side and an upper side from the body 2. FIG. 6 is a schematic sectional view of the mount device arranged between the outboard motor 3a and the attachment device for attaching the outboard motor 3a to the body 2 according to the present embodiment. FIG. 7 is an explanatory view of a lifting force acted on the outboard motor according to the present embodiment. FIGS. 8A and 8B are explanatory views of a displacement of the attachment device shown in FIGS. 5A to 5C.

As shown in FIG. 4, the outboard motor body 30a of the outboard motor 3a has an engine holder 40 and the engine 301a is received in the engine holder 40. An oil pan 41 is arranged below the engine holder 40. A drive shaft housing 42 is installed in a lower portion of the oil pan 41 and a gear case 43 is installed in a lower portion of the drive shaft housing 42. Also, the engine 301a, the engine holder 40 and the oil pan 41 are covered with an engine cover 44.

The engine 301a is constituted of a crank case 45, a cylinder block 46 and a cylinder head 47 arranged in this order from a front side toward a rear side of the outboard motor 30a. The cylinder block 46 has a cylinder (not shown) generally horizontally formed for allowing a piston (not shown) to be reciprocally moved therein, and a crankshaft 48 is generally vertically arranged between the crank case 45 and the cylinder block 45.

The drive shaft 49 is co-linearly connected (e.g., spline-connected) to a lower end portion of the crankshaft 48. The drive shaft 49 extends generally vertically inside the engine holder 40, the oil pan 41, the drive shaft housing 42 and the gear case 43, and connected to a propeller shaft 51 via a bevel gear 50 in the gear case 43. Thus, a driving force of the engine 301a (more specifically, a rotational force of the crankshaft 48) is transmitted to the propeller 33a connected to the propeller shaft 51 via the drive shaft 49, the bevel gear 50 and the propeller shaft 51.

Also, the outboard motor 3a has an attachment device 10 configured to support the outboard motor body 30a and also to be capable of griping a transom 2a of the body 2, and a mount device 20 arranged between the outboard motor body 30a and the attachment device 10. The attachment device 10 includes a pair of clamp brackets 11a and 11b arranged in a right and left direction of the body 2 and a swivel bracket 12 arranged between the clamp brackets 11a and 11b (see FIGS. 5A to 5C). The mount device 20 is constituted of an upper mount unit 20a and/or a lower mount unit 20b.

As shown in FIGS. 5A and 5C, the swivel bracket 12 is arranged to be sandwiched between the pair of clamp brackets 11a and 11b. The swivel bracket 12 has, at an upper end portion thereof, a protrusion 121 protruding toward the front side of the body 2 (see FIG. 5C). In the vicinity of a front end portion of the protrusion 121, an insertion hole 122 through which a tilting axle 112 of the clamp brackets 11 as described below is inserted is provided. Also, a swivel axle 123 is provided in the vicinity of a rear end portion of the swivel bracket 12. The swivel axle 123 is arranged to extend in the upward and downward direction of the body 2. The outboard motor body 3a is held to be pivotable about the swivel axle 123 in the right and left directions (La direction and Ra direction) relative to the body 2.

The clamp brackets 11a and 11b have, at upper end portions thereof, a hook portion 111 protruding toward the front side of the body 2 (see FIGS. 5B and 5C). The hook portions 111 have generally the same shape as that of the protrusion 121 of the swivel bracket 12 as viewed from a lateral side thereof, and is configured to be capable of being locked on the transom 2a of the body 2. The tilting axle 112 is provided on front end portions of the hook portions 111. The tilting axle 112 is arranged between the hook portions 111 of the pair of clamp brackets 11a and 11b to be perpendicular to the swivel axle 123 and also to extend in a width direction (right and left direction) of the body 2. The outboard motor body 30a held on the swivel bracket 12 is configured to be pivotable about the tilting axle 112 in the upward and downward direction (vertical direction).

As shown in FIG. 4, the upper mount unit 20a constituting the mount device 20 is installed on a front side portion of the engine holder 40. Also, the lower mount unit 20b constituting the mount device 20 is arranged on a front side portion of the drive shaft housing 42. Herein, configurations of the mount device 20 will be described using the lower mount unit 20b. It will be noted that configurations of the upper mount unit 20a are appropriately illustrated on only figures by changing a suffix b in the lower mount unit 20b into a suffix a.

Figure 6A:
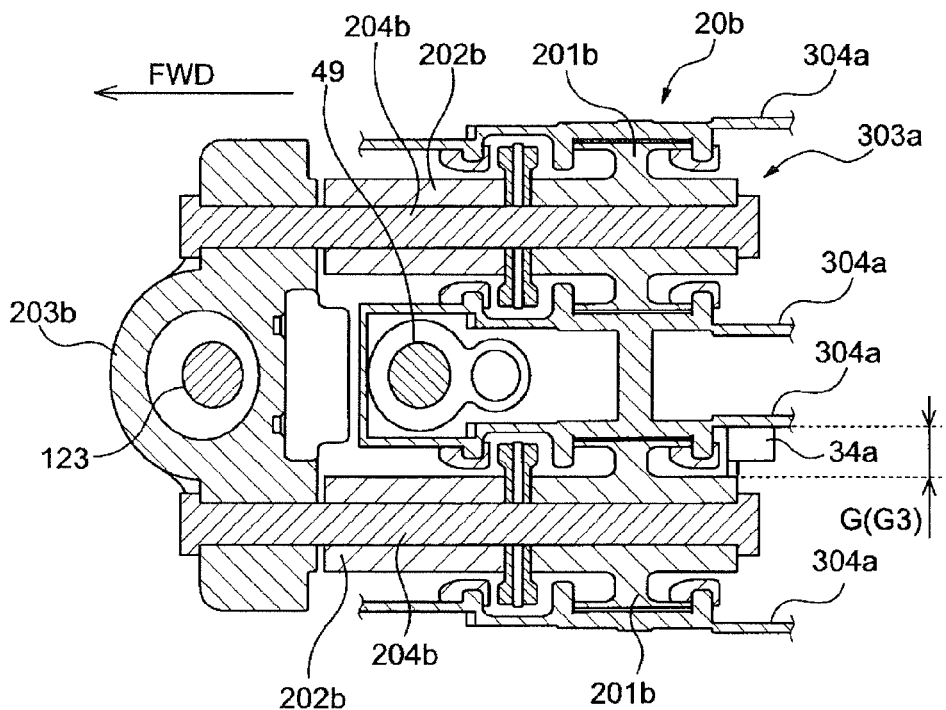
FIGS. 6A and 6B are schematic sectional views of a mount device arranged between the outboard motor and the attachment device for attaching the outboard motor to the body according to the present embodiment.
Figure 6B:
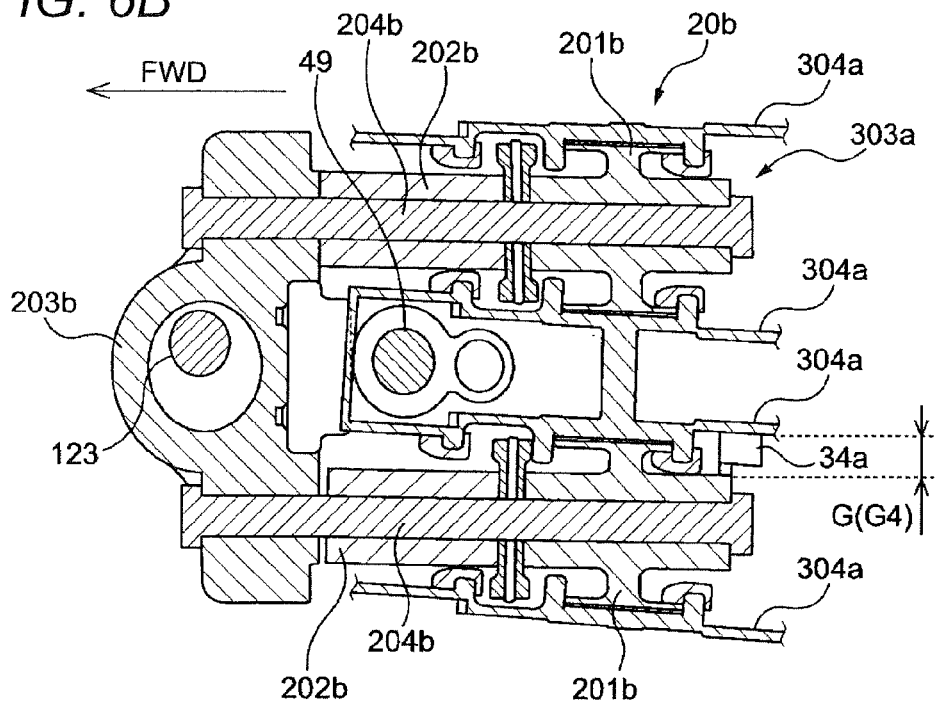

FIGS. 6A and 6B show a schematic sectional view of the lower mount unit 20b. In FIGS. 6A and 6B, a sectional view taken though an axis of a lower mount bolt 204b as described below is shown. The lower mount unit 20b is arranged in a state where parts thereof (lower mounts 201b and lower thrust mounts 202b as described below) are received in a receiving portion 303a provided in the outboard motor body 30a and other parts thereof (lower mount bracket 203b as described below) are exposed outside the outboard motor body 30a (see FIGS. 4, 6A and 6B).

As shown in FIG. 6A, the lower mount unit 20b includes a pair of lower mounts 201b arranged side by side in a width direction (right and left direction) of the outboard motor 3a, a pair of lower thrust mounts 202b arranged in front of the lower mounts 201b, a lower mount bracket 203b arranged in front of the lower thrust mounts 202b, and a pair of lower mount bolts 204b for connecting the pair of lower mounts 201b, the pair of lower thrust mounts 202b and the lower mount bracket 203b together.

The lower mounts 201b and the lower thrust mounts 202b are intended to sever as damping members and are fixed to a wall surface portion 304a defining the receiving portion 303a. In this case, the lower mounts 201b and the lower thrust mounts 202b are configured to be fixed to the wall surface portion 304a via an elastic body, such as rubber, thereby inhibiting a vibration of the engine 301a to be transmitted to the body 2.

The lower mount bracket 203b is arranged outside the outboard motor 30a. The lower mount bracket 203b is provided with a though-hole extending therethrough in the upward and downward direction. The lower mount bracket 203b is configured to be capable of holding the swivel axle 123 provided in the swivel bracket 12 due to the through-hole.

The pair of lower mount bolts 204b are configured to be inserted into though-holes formed in the lower mounts 201b, the lower thrust mounts 202b and the lower mount bracket 203b in a forward and backward direction of the body 2 and thus to connect them together. In this way, a part (swivel axle 123) of the attachment device 10 is held by the lower mounts 201b and the lower thrust mounts 202b, which are fixed to a part of the outboard motor body 30a, and the lower mount bracket 203b, and thus the outboard motor 3a is attached to the body 2 via the lower mount unit 20b (mount device 20) and the attachment device 10.

When the outboard motors 3a and 3b are propelled in a state attached to the body 2 as described above, a lifting force is generated at a location of each of the outboard motors 3a and 3b. Now, a lifting force acted on the outboard motors 3a and 3b according to the present embodiment will be described with reference to FIG. 7. In FIG. 7, for convenience of description, only the attachment device 10, the mount device 20 (upper mount unit 20a) and the propeller 33a constituting the outboard motor 3a are shown as viewed from the rear side of the body 2. Herein, it is assumed that the propeller 33a rotates in a clockwise direction.

As described above, the outboard motor 3a is fixed to the transom 2a of the body 2 by the hook portions 111 of the clamping brackets 11a and 11b. When a steering angle or toe angle of a submerged portion of the outboard motor 3a is not coincided with an advancing direction of the body 2 (water flow direction of the body 2), as shown in FIG. 7, a lifting force L1 is generated on the submerged portion of the outboard motor 3a. Along with generation of the lifting force L1, a force L2 acted in the same direction (right direction shown in FIG. 7) is generated in the vicinity of the lower mount unit 20b. On the other hand, a force L3 acted in the opposite direction (left direction shown in FIG. 7) is generated in the vicinity of the tilting axle 112 of the attachment device 10. Meanwhile, the force L2 is closer to the propeller 33a than the force L3 and thus is larger than the force L3.

In the toe angle control system 100 according to the present embodiment, the lifting sensor 34a is installed at a predetermined position on the attachment device 10 or mount device 30, at which such lifting forces can be detected. For example, the lifting force sensor 34a may be installed at a predetermined position on either one of the attachment device 10 and the mount device 20 or may be installed at predetermined positions on both of the attachment device 10 and the mount device 20. Now, examples of the installation position of the lifting force sensor 34a on the attachment device 10 and the mount device 20 will be described.

In the attachment device 10, the lifting force sensor 34a can be provided, for example, at a position which is located in the vicinity of a base end portion of the hook portion 111 of each of the clamp brackets 11a and 11b and also on an inner side thereof (see FIG. 5B). In this case, the lifting force sensor 34a is constructed by, for example, a strain gauge. The lifting forced sensor 34a detects a lifting force, which is generated along with propulsion of the outboard motor 3a (engine 301a), as a function of a load (an amount of strain) acted on the clamp brackets 11a and 11b due to the lifting force. Because the load acted on the clamp brackets 11a and 11b is used for detection of the lifting force in this way, the lifting force generated along with propulsion of the outboard motors 3a and 3b can be precisely detected.

Also, the lifting force sensor 34a can be provided at a position which is located in the vicinity of a lower end portion of the swivel bracket 12 and also close to the clamp brackets 11 (see FIG. 5B). FIG. 8A is an enlarged view of a region within a two-dot chain line shown in FIG. 5B as viewed from the upper side thereof. As shown in FIG. 8A, the lifting force sensor 34a is arranged at a position, at which a gap G between the swivel bracket 12 and the clamp bracket 11a can be detected. In this case, the lifting forces sensor 34a is constructed by, for example, a displacement sensor. The lifting force sensor 34a has a contactor in contact with the clamp bracket 11a and is configured to be capable of detecting a change in position of the swivel bracket 12 relative to the clamp bracket 11a from a position of the contactor. Namely, the lifting force sensor 34a detects a lifting force, which is generated along with propulsion of the outboard motor 3a (engine 301a), as a function of displacement of the clamp bracket 11a and the swivel bracket 12 (specifically, an amount of change in the gap G) due to the lifting force. Because displacement of the clamp bracket 11a and the swivel bracket 12 is used for detection of the lifting force in this way, the lifting force generated along with propulsion of the outboard motors 3a and 3b can be precisely detected.

If the force L2 shown in FIG. 7 is generated in the vicinity of the lower mount unit 20b, then the swivel bracket 12, as shown in FIG. 8B, is slightly displaced toward the right side shown in the figure. The gap G between the swivel bracket 12 and the clamp bracket 11a in this case is designated as a gap G2. The lifting force sensor 34a detects, as a lifting force information, a difference between the gap G2 after driving of the outboard motor 3a (engine 301a) and a gap G1 (see FIG. 5A) during non-driving of the outboard motor 3a (engine 301a).

In addition, the lifting force sensor 34a can be provided at a position which is located on the wall surface portion 304a of the receiving portion 303a for receiving the mount device 20 (lower mount unit 20b) and also opposes the lower mount 201b. In this case, the lifting forces sensor 34a is constructed by, for example, a displacement sensor. The lifting force sensor 34a has a contactor in contact with the lower mount 201b and is configured to be capable of detecting a change in position of the lower mount 201b relative to the wall surface portion 304a from a position of the contactor. Namely, the lifting force sensor 34a detects a lifting force, which is generated along with propulsion of the outboard motor 3a (engine 301a), as a function of displacement of the lower mount 201b (specifically, an amount of change in a gap G) due to the lifting force. Because displacement of the mount device 20 is used for detection of the lifting force in this way, the lifting force generated along with propulsion of the outboard motors 3a and 3b can be precisely detected.

If the force L2 shown in FIG. 7 is generated in the vicinity of the lower mount unit 20b, then the lower mount 201b and lower thrust mount 202b which constitute the lower mount unit 20b, as shown in FIG. 6B, are slightly displaced toward the lower side shown in the figure. The gap G between the wall surface portion 304a and the lower mount 201b in this case is designated as a gap G4. The lifting force sensor 34a detects, as a lifting force information, a difference between the gap G4 after driving of the outboard motor 3a (engine 301a) and a gap G3 (see FIG. 6A) during non-driving of the outboard motor 3a (engine 301a).

Figure 9:
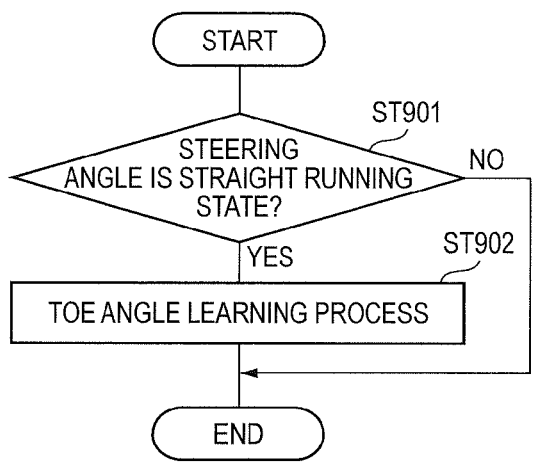
FIG. 9 is a flow chart explaining a toe angle learning process of the outboard motor toe angle control system according to the present embodiment.
Figures 10, 11:
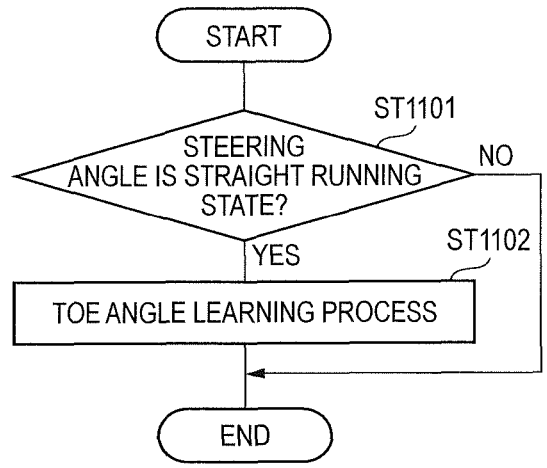
FIG. 10 is an explanatory view of a toe angle data table recorded in the toe angle learning process of the outboard motor toe angle control system according to the present embodiment.
FIG. 11 is a flow chart explaining a toe angle control process of the outboard motor toe angle control system according to the present embodiment.

The lifting force detected by the lifting forces sensor 34a installed at each position as described above, is outputted to the control unit 6. The control unit 6 records the lifting force on the toe angle data table during the toe angle learning process. On the basis of the toe angle data table including lifting forces in this way, the control unit 6 selects an optimal toe angle to a speed and a trim angle of the ship 1 during running. Then, the outboard motor bodies 30a and 30b are driven by the steering units 31a and 31b to have the selected toe angle. Now, the toe angle learning process and toe angle control process of the toe angle control system 100 according to the present embodiment will be described with reference to FIGS. 9 to 11. FIG. 9 is a flow chart explaining the toe angle learning process of the toe angle control system 100 according to the present embodiment. FIG. 10 is an explanatory view of the toe angle data table recorded in the memory unit 9 during the toe angle learning process of the toe angle control system 100 according to the present embodiment. FIG. 11 is a flow chart explaining the toe angle control process of the toe angle control system 100 according to the present embodiment.

In the following, for convenience of description, the toe angle learning process and toe angle control process, which are executed in only a case where a steering angle by the ship operator is a straight running state, will be described. However, contents of the toe angle learning process and toe angle control process of the toe angle control system 100 according to the present embodiment are not limited to that, and thus the present invention can be applied to cases where the steering angle is a state other than the straight running state.

The toe angle learning process is executed, for example, when an execution instruction from the ship operator is received. Providing a dedicated button for receiving the execution instruction from the ship operator (hereinafter, simply referred to as a 'toe angle learning instruction button') on an operation seat is preferable as an embodiment. Herein, the case where the toe angle learning instruction button is provided on the operation seat and the toe angle learning instruction button is selected by the ship operator will be described.

When the toe angle learning instruction button is selected, as shown in FIG. 9, the control unit 6 decides whether or not a steering angle is a straight running state prior to execution of the toe angle learning process (Step (hereinafter, referred to as 'ST') 901). For example, the control unit 6 can decide the steering angle depending on an output signal from the steering operating angle sensor 7. Herein, in cases where the steering angle is a state other than the straight running state, the control unit 6 does not execute the toe angle learning process and thus ends the procedure.

On the other hand, if the steering angle is the straight running state, the control unit 6 executes the toe angle leaning process (ST902). In the toe angle learning process, lifting forces in cases where, while a toe angle of the outboard motors 3a and 3b is fixed at a constant value, a speed of the body 2 is changed and also a trim angle of the outboard motors 3a and 3b are changed are learned and recorded in a toe angle data table. Further, after learning lifting forces corresponding to a predetermined plurality of speeds and trim angles, the toe angle of the outboard motors 3a and 3b is changed and then a procedure in which lifting forces are recorded in a toe angle data table in the same manner is repeated. After recording lifting forces in the toe angle data table in accordance at a predetermined plurality of toe angles, the control unit 6 ends the toe angle learning process.

In FIG. 10, one example of toe angle data tables in a case where with respect to three predetermined toe angles T1 to T3, speeds (V1 to V5) of the body 2 and trim angles (TR1 to TR5) of the outboard motors 3a and 3b are changed in five stages is shown. For example, toe angles T1 and T2 can be assigned as toe angles for a toe-out state and a toe angle T3 can be assigned as a toe angle for a toe-in state.

In each toe angle data table, a lifting force depending on each speed and each trim angle is recorded. For example, in the toe angle data table for the toe angle T1, a lifting force V1TR1 is recorded as a lifting force detected in a case of a speed V1 and a trim angle TR1 and a lifting force V5TR5 is recorded as a lifting force detected in a case of a speed V5 and a trim angle TR5. Also, in toe angle data tables for toe angles T2 and T3, a lifting force depending on each speed and each trim angle is recorded in the same manner.

From contents recorded in this way, a trim angle generating the smallest lifting force in each toe angle data table can be specified for each speed and also a speed generating the smallest lifting force can be specified for each trim angle. In addition, by referring to recorded contents between the toe angle data tables, a toe angle generating the smallest lifting force depending on speeds and trim angles of the body 2 can be specified from the toe angle data tables.

Meanwhile, the toe angle learning process is generally executed at a point of time at which the outboard motors 3a and 3b are mounted on the body 2. The toe angle learning process is preferably executed in a state where a sufficient space is ensured on the periphery of the body 2, because lifting forces at a plurality of toe angles, speeds and trim angles have to be learned. In the toe angle leaning process in accordance with selection of the toe angle learning instruction button as described above, it is assumed that the body 2 runs while a plurality of toe angles, speeds and trim angles are automatically changed. However, toe angles, speeds or trim angles required in the toe angle leaning process may be manually changed by the ship operator.

On the basis of contents of the toe angle data tables as shown in FIG. 10, the control unit 6 controls a toe angle of the outboard motors 3a and 3b to become an optimal toe angle to a speed of the body 2 and a trim angle of the outboard motors 3a and 3b (toe angle control process). For example, the toe angle control process is automatically executed during running of the ship 1. Alternatively, a dedicated button for receiving the execution instruction from the ship operator (hereinafter, simply referred to as a 'toe angle control instruction button') may be provided on the operation seat and thus the toe angle control process may be executed by the toe angle control instruction button. Herein, the case where the toe angle control process is automatically executed during running of the ship 1 will be described.

When the ship 1 is running, as shown in FIG. 11, the control unit 6 decides whether or not a steering angle is a straight running state prior to execution of the toe angle control process (ST 1101). For example, the control unit 6 can decide the steering angle depending on an output signal from the steering operating angle sensor 7. Herein, in cases where the steering angle is a state other than the straight running state, the control unit 6 does not execute the toe angle control process and thus ends the procedure. Then, an operation of monitoring a steering angle is continued.

On the other hand, if the steering angle is the straight running state, the control unit 6 executes the toe angle control process (ST1102). In the toe angle control process, a speed of the body 2 and a trim angle of the outboard motors 3a and 3b are detected, and then a toe angle of the outboard motors 3a and 3b are controlled to become an optimal toe angle to the speed and the trim angle based on recorded contents of the toe angle data tables.

In this case, the control unit 6 can specify the speed of the body 2 and the trim angle of the outboard motors 3a and 3b, respectively, depending on output signals from the ship speed sensor 8 and the trim angle sensors 322a and 322b. Also, the control unit 6 can drive the steering actuators 311a and 311b to control a toe angle of the outboard motors 3a and 3b.

The control unit 6 continues to execute the toe angle control process during running of the ship 1. Thus, a toe angle of the outboard motors 3a and 3b can be flexibly set to an optimal toe angle depending on a speed of the body 2 and a trim angle of the outboard motors 3a and 3b varied during running. Also, for example, when reasons of ending the process, such as stop of the ship 1, are occurred, the control unit 6 ends the toe angle control process.

As described above, according to the toe angle control system 100 of the present embodiment, a toe angle of the outboard motors 3a and 3b can be selected to minimize a lifting force depending on a speed of the ship 1 and a trim angle of the outboard motors 3a and 3b detected, on the basis of the contents of the toe angle data tables. Accordingly, the toe angle of the outboard motors 3a and 3b can be adjusted to be optimized to a current running state of the ship 1 by the control unit 6. As a result, an optimal toe angle can be set to the outboard motors 3a and 3b without requiring complex operations from the ship operator. At this time, because a toe angle of the outboard motors 3a and 3b which minimize a lifting force is set to an optimal toe angle, a speed of the ship 1 can be maximized.

According to the toe angle control system 100 of the present embodiment, a lifting force can be detected as a function of loads acted on the clamp brackets 11 and 11b, which constitute the attachment device 10. In this case, a lifting force generated on the clamp brackets 11a and 11b along with propulsion of the outboard motors 3a and 3b can be precisely detected. Thus, precision of lifting forces recorded in the toe angle data tables can be ensured and thus precision of adjustment of a toe angle by the control unit 6 can be enhanced.

Also, according to the toe angle control system 100 of the present embodiment, a lifting force can be detected as a function of displacement of the clamp brackets 11a and 11b and swivel bracket 12, which constitute the attachment device 10. In this case, a lifting force generated on the clamp brackets 11a and 11b and swivel bracket 12 along with propulsion of the outboard motors 3a and 3b can be precisely detected. Thus, precision of lifting forces recorded in the toe angle data tables can be ensured and thus precision of adjustment of a toe angle by the control unit 6 can be enhanced.

In addition, according to the toe angle control system 100 of the present embodiment, a lifting force can be detected as a function of displacement of the mount device 20. In this case, a lifting force generated on the mount device 20 along with propulsion of the outboard motors 3a and 3b can be precisely detected. Thus, precision of lifting forces recorded in the toe angle data tables can be ensured and thus precision of adjustment of a toe angle by the control unit 6 can be enhanced.

Meanwhile, the present invention is not limited to each of the foregoing embodiments, but can be variously modified and embodied. Components, control flows and the like in the foregoing embodiments are not limited to those shown in the accompanying drawings, but can be appropriately modified within the scope of exhibiting the effects of the present invention. In addition, appropriate modifications can be made without departing from the object of the present invention.

For example, in the foregoing embodiments, the cases where the lifting force sensor 34a is installed at a predetermined position on the attachment device 10 and/or the mount device 20 has been described. However, the installation site of the lifting force sensor 34a is not limited to such positions, but can be appropriately modified. For example, under a condition that a lifting force generated along with propulsion of the outboard motors 3a and 3b can be detected, the lifting force sensor 34a may be installed at a certain position on the outboard motors 3a and 3b.

Also, in the foregoing embodiments, a toe angle of the outboard motors 3a and 3b can be adjusted by pivoting the outboard motor bodies 30a and 30b in right and left directions of the body 2 by the same angle, but the present invention is not necessary limited to that. For example, the toe angle of the outboard motors 3a and 3b may adjusted by pivoting the outboard motor bodies 30a and 30b in right and left direction of the body 2 by different angles.

In addition, in the foregoing embodiments, the case where the toe angle data tables, in which running states (ship speeds and trim angles) of the ship 1 and lifting forces detected by the lifting force sensors 34a and 34b are associated with each other for each toe angle of the outboard motors 3a and 3b, are stored in the memory unit 9 has been described. However, contents of the toe angle data tables stored in the memory unit 9 are not limited to that, but can be appropriately modified. Under a condition that a toe angle minimizing a lifting force can be specified based on running states (ship speeds and trim angles) of the ship 1, contents of the toe angle data tables may be appropriately modified.

As described above, the present invention has the effects that an optimal toe angle can be set to outboard motors without requiring complex operations from a ship operator, and in particular, is useful to ships to which improvement of running performance or combustion efficiency is required.

What is claimed is:

1. A toe angle control system for outboard motors, comprising:
 a plurality of outboard motors mounted on a body of a ship;
 a ship speed sensor configured to detect a speed of the ship, and a trim angle sensor configured to detect trim angles of the outboard motors as running states of the ship;
 a lifting force detector configured to detect a lifting force generated along with propulsion of the plurality of outboard motors;
 a memory unit configured to store therein a toe angle data table in which the running states of the ship detected by the ship speed sensor and the trim angle sensor, and the lifting force detected by the lifting force detector are associated with each other for each toe angle of the outboard motors; and
 a controller configured to adjust a toe angle of the outboard motors based on the running states of the ship detected by the ship speed sensor and the trim angle sensor, and the toe angle data table stored in the memory unit, wherein the toe angle data table associated with the running states of the ship for the plurality of outboard motors are mounted on the ship is stored in the memory unit, and wherein the controller selects a toe angle of the outboard motors so as to minimize the lifting force depending on the speed of the ship and the trim angles of the outboard motors detected by the ship speed sensor and the trim angle sensor.

2. The toe angle control system for the outboard motors according to claim 1, wherein the lifting force detector detects the lifting force as a function of a load acted on clamp brackets constituting an attachment device for attaching the outboard motors to the body.

3. The toe angle control system for the outboard motors according to claim 1, wherein the lifting force detector detects the lifting force as a function of displacement of clamp brackets and a swivel bracket constituting an attachment device for attaching the outboard motors to the body.

4. The toe angle control system for the outboard motors according to claim 1, wherein the lifting force detector detects the lifting force as a function of displacement of a mount device arranged between an attachment device for attaching the outboard motors to the body and the outboard motors.

5. The toe angle control system for the outboard motors according to claim 1, wherein the lifting force detector detects the lifting force as a function of displacement of a component of the outboard motors.

6. A toe angle control method in a toe angle control system for outboard motors, the toe angle control system comprising: a plurality of outboard motors mounted on a body of a ship; ship speed sensor configured to detect speed of the ship, and a trim angle sensor configured to detect trim angles of the outboard motors as running states of the ship; a lifting force detector configured to detect a lifting force generated along with propulsion of the plurality of outboard motors; a memory unit configured to store therein a toe angle data table in which the running states of the ship detected by the ship speed sensor and the trim angle sensor and the lifting force detected by the lifting force detector are associated with each other for each toe angle of the outboard motors; and a controller configured to adjust a toe angle of the outboard motors based on the running states of the ship detected by the ship speed sensor and the trim angle sensor and the toe angle data table stored in the memory unit, the toe angle control method comprising:

storing the toe angle data table associated with the running states of the ship in a state where the plurality of outboard motors are mounted on the ship, in the memory unit; and selecting a toe angle of the outboard motors so as to minimize the lifting force depending on the speed of the ship detected by the ship speed sensor and trim angles of the outboard motors detected by the trim angle sensor.

* * * * *